S. I. FEKETE.
OIL CUP.
APPLICATION FILED JULY 7, 1920.

1,391,467.

Patented Sept. 20, 1921.

INVENTOR:
Stephen I. Fekete
by Macleod, Calver, Copeland & Dike
Attys.

UNITED STATES PATENT OFFICE.

STEPHEN I. FEKETE, OF DETROIT, MICHIGAN, ASSIGNOR TO ESSEX MOTORS, OF DETROIT, MICHIGAN, A CORPORATION OF MICHIGAN.

OIL-CUP.

1,391,467.  Specification of Letters Patent.  Patented Sept. 20, 1921.

Application filed July 7, 1920. Serial No. 394,443.

*To all whom it may concern:*

Be it known that I, STEPHEN I. FEKETE, a citizen of Hungary, residing at Detroit, county of Wayne, State of Michigan, have invented a certain new and useful Improvement in Oil-Cups, of which the following is a specification, reference being had therein to the accompanying drawings.

The invention relates to oil cups such as are used particularly on the shackle bolts of an automobile chassis. An important object is to provide a cup of large capacity adapted for use on horizontal shackle bolts to do away with the frequent refilling which has been necessary with the comparatively small cups now in general use. The oil cup shown in the present application is an improvement on the one shown in my prior application, Serial No. 352,809, filed January 20, 1920, to which reference may be had for a fuller explanation of the purposes, mode of operation and advantages of oil cups of the type shown and broadly claimed therein. The particular object of the present invention is to provide a cup which will have all the advantages of the oil cup shown in my prior application and will be more certain in operation and better adapted to be manufactured in large quantities.

The invention will be fully understood from the following description when taken in connection with the accompanying drawings, and the novel features thereof will be pointed out and clearly defined in the claims at the close of this specification.

In the drawings, Figure 1 is a vertical section of an oil cup embodying the invention.

Figure 1:
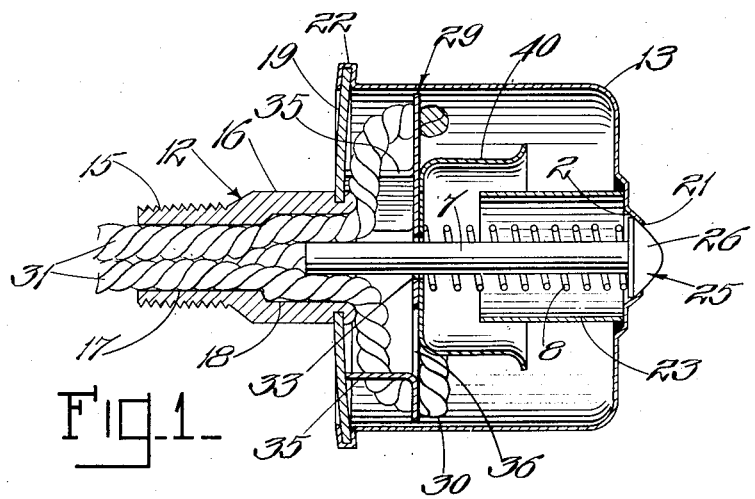

Referring now to the drawings, the oil cup comprises the following parts:—a stem 12, an end piece or bottom 19, a body or casing 13, a wick retainer 29, a baffle 40, an oil introduction tube 23, a valve 25, a spring 8 and wicking 30.

The stem 12 is adapted for connection with the part to be lubricated, and is screw-threaded as shown at 15, is shaped at 16 for the reception of a wrench, and is bored and counter-bored at 17 and 18 respectively to form the outlet passage for the oil.

The body 13 is made from very thin material, such as sheet steel or brass, which is pressed or spun into the desired form and is closed at one end with the exception of a centrally disposed opening 21 therein which forms the inlet opening of the oil cup. The opposite end 22 of the body is given a slightly larger diameter than the main body portion to form a flange by which the casing and the end piece 19 are secured together. When the parts are assembled, the end piece 19 is inserted in the enlarged part 22 of the body, and they are secured together by spinning the edge of the body over onto the edge of the end piece.

Secured to the interior of the casing as by brazing or soldering and surrounding the inlet opening 21, is an oil introduction tube 23. This tube extends inwardly and prevents the oil from splashing out of the inlet opening. It keeps the oil from running out when the cup is tilted by the movement of the vehicle to which it is attached. Adjacent the inlet opening 21 and within the oil introduction tube 23, the casing is formed into a valve seat 2 which coöperates with a valve 25 to close the said inlet opening. The valve is formed with a head 26 and a long stem 7 which extends through baffle 40, the wick retainer 29, the end piece 19 and into the counter-bore 18 in the stem 12 of the casing. The valve is normally held against the seat 2 by a spring 8 coiled about the valve stem, one end of said spring engaging the head 26 of the valve and the other end engaging the baffle 40 which itself rests against the wick retainer.

The oil feeding means consists of wicking, shown at 30, arranged in a series of strands so spaced inside the casing that the wicking will always be immersed in the oil regardless of the position of the oil cup. These strands are held in place by the wick retainer 29, and their free ends 31 extend through the outlet opening in the casing. The wick retainer 29 is loosely mounted in the casing and comprises a disk 3 provided with a hole 33 located centrally thereof to allow for the passage of the valve stem, and holes 34 cut through the periphery thereof and spaced apart at intervals about the center. The disk 3 is also provided with legs 35 which are struck up in forming the holes 36, and which contact with the end piece 19. I prefer to make the holes 34 of the form shown in the drawings so that the wicking can be put in place without threading it through holes.

Figure 2:
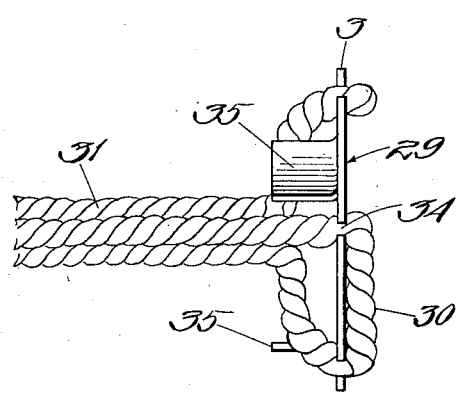
Fig. 2 is a detail view of the oil feeding means and the supporting disk therefor.
Figure 3:
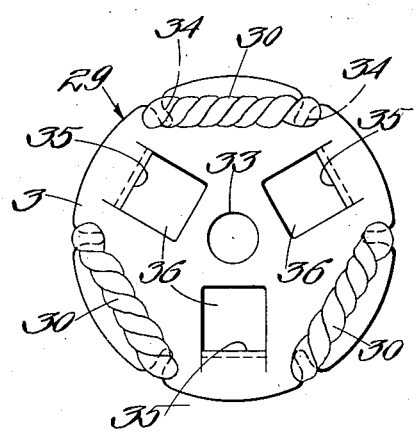
Fig. 3 is an end view of the parts shown in Fig. 2.

The wicking is attached to the wick retainer 29 by insertion in the holes 34, as shown in Figs. 2 and 3, and the free ends 31 are carried down between the flat part of the disk and the adjacent side of the casing and into the counter-bore 18, which is large enough to contain the strands and the stem of the valve without jamming the wicking. The ends of the strands are then carried through the bore 17. The size of the bore 17 and the amount of the wicking employed are such that the bore will be completely filled so that free flow of the oil is prevented but is not filled full enough so that capillary flow is interfered with.

The wick retainer serves to guide the valve stem. Both the wick retainer 29 and the baffle 40 are held in place by the valve spring 8.

In assembling the oil cup, the valve 25 with the spring 8 surrounding it is put in place, then the baffle 40 and wick retainer 29 are placed over the valve stem 7, and finally the wicking pulled through the stem, the casing 13 and end piece 19 put together and the edge 22 spun into place to secure the whole together.

This construction is such that a minimum of operations is required in manufacturing the oil cup and it is not necessary to solder or braze the baffle or wick retainer in place.

What I claim is:—

1. In an oil cup, a casing having an inlet and outlet opening, an oil introduction tube surrounding the inlet opening, a valve adapted to close the inlet opening, wicking in the casing extending into the outlet opening, and a wick retaining member having holes therein by which the wicking is held in position in the casing.

2. In an oil cup, a casing having an inlet and an outlet opening, an oil introduction tube surrounding the inlet opening, a valve adapted to close the inlet opening, wicking in the casing extending into the outlet opening, a wick retaining member loosely disposed in said casing and having holes therein by which the wicking is held, and means for positioning said member in the casing.

3. In an oil cup, a casing having an inlet and outlet opening, an inwardly extending oil introduction tube surrounding the inlet opening, a valve adapted to close the inlet opening, wicking in the casing extending into the outlet opening, a loose wicking retaining member, and a valve spring, one end of which acts on the valve and the other end on the wicking retaining member to hold both members in position.

4. In an oil cup, a casing having an inlet and outlet opening, an inwardly extending oil introduction tube surrounding the inlet opening, a valve having a stem and adapted to close the inlet opening, wicking in the casing extending into the outlet opening, a loose wicking retaining member having a hole forming a guide for the valve stem, and a spring, one end of which acts on the valve and the other end on the wicking retaining member to hold both members in position.

5. In an oil cup, a casing having an inlet and outlet opening, an inwardly extending oil introduction tube surrounding the inlet opening, a valve adapted to close the inlet opening, wicking in the casing extending into the outlet opening, a loose wicking retaining member, a baffle, and a valve spring, one end of which acts on the valve and the other end on the wicking retaining member and the baffle to hold said members in position.

6. In an oil cup, a casing having an inlet and outlet opening, an inwardly extending oil introduction tube surrounding the inlet opening, a valve having a stem and adapted to close the inlet opening, wicking in the casing extending into the outlet opening, a loose wicking retaining member and a baffle, each having a hole forming a guide for the valve stem, and a spring, one end of which acts on the valve and the other end on the wicking retaining member and baffle to hold said members in position.

7. In an oil cup, a casing having an inlet and outlet opening, an inwardly extending oil introduction tube surrounding the inlet opening, a wick retaining member having legs spacing it from the end of the cup, a valve and a spring acting on the valve and on the retainer to hold it in position with the legs against the end of the cup.

8. In an oil cup, a casing having inlet and outlet openings, a wick retainer to hold the wicking in radial arrangement relatively to the outlet opening, and having holes arranged about its periphery to receive the wicking, and wicking in said holes and extending into the outlet opening.

9. In an oil cup, a casing having inlet and outlet openings, a wick retainer loosely disposed in said casing and having holes arranged about its periphery to receive the wicking and hold the same in radial arrangement with respect to said outlet opening, means for positioning said wick retainer in said casing, and wicking in said holes and extending into the outlet opening.

In testimony whereof I affix my signature.

STEPHEN I. FEKETE.